(12) United States Patent
Robert et al.

(10) Patent No.: US 10,640,876 B2
(45) Date of Patent: May 5, 2020

(54) ELECTRICAL INTERCONNECTS FOR BATTERY CELLS

(71) Applicant: FORD GLOBAL TECHNOLOGIES, LLC, Dearborn, MI (US)

(72) Inventors: Brian Joseph Robert, St. Clair Shores, MI (US); James Maurice Boileau, Novi, MI (US); Thomas P. Brackett, III, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 214 days.

(21) Appl. No.: 15/473,861

(22) Filed: Mar. 30, 2017

(65) Prior Publication Data

US 2018/0287316 A1  Oct. 4, 2018

(51) Int. Cl.
*H01M 10/0525* (2010.01)
*H01M 2/20* (2006.01)
*C23C 24/08* (2006.01)
*C23C 24/04* (2006.01)
*H01M 2/10* (2006.01)
*H01M 2/30* (2006.01)

(52) U.S. Cl.
CPC ............ *C23C 24/087* (2013.01); *C23C 24/04* (2013.01); *H01M 2/1061* (2013.01); *H01M 2/1077* (2013.01); *H01M 2/202* (2013.01); *H01M 2/30* (2013.01)

(58) Field of Classification Search
CPC ..................... H01M 10/0525; H01M 2/202
See application file for complete search history.

(56) References Cited

U.S. PATENT DOCUMENTS

| 8,414,977 B2 | 4/2013 | Ikejiri | |
| 2012/0052331 A1* | 3/2012 | Park | H01M 2/202 |
| | | | 429/7 |
| 2013/0072075 A1 | 3/2013 | Kayamoto | |
| 2013/0157104 A1 | 6/2013 | Ulicny et al. | |
| 2014/0106191 A1 | 4/2014 | Itaya et al. | |
| 2016/0149195 A1 | 5/2016 | Yamauchi et al. | |
| 2016/0156013 A1 | 6/2016 | Yamauchi et al. | |

FOREIGN PATENT DOCUMENTS

| JP | 2007-335289 | * 12/2007 | ............. H01M 2/10 |
| JP | 2008-251260 | * 10/2008 | ............. H01M 2/26 |

OTHER PUBLICATIONS

C. Shao et al., "Characterization and Monitoring of Tool Wear in Ultrasonic Metal Welding", IWMF2014, 9th International Workshop on Microfactories, Oct. 5-8, 2014, Honolulu, USA, pp. 161-169.
S. Marx et al., "Cold Spraying: Innovative Layers for New Applications," Journal of Thermal Spray Technology, vol. 15(2) Jun. 2006, pp. 177-183.
X. Wu et al., "Microstructure, Welding Mechanism, and Failure of Al/Cu Ultrasonic Welds,", Procedia Manufacturing Elsevier, vol. XXX, 2015, pp. 1-19.

* cited by examiner

*Primary Examiner* — Osei K Amponsah
(74) *Attorney, Agent, or Firm* — David Kelley; Brooks Kushman P.C.

(57) ABSTRACT

A battery pack includes a pouch cell having electrode tabs extending therefrom, each of the tabs defining a plurality of perforations, a busbar including a plurality of raised portions in contact with and protruding through the perforations, and an agglomeration of mechanically bound solid metal particles overlaying the raised portions to mechanically bind and electrically connect the tabs to the busbar.

20 Claims, 8 Drawing Sheets

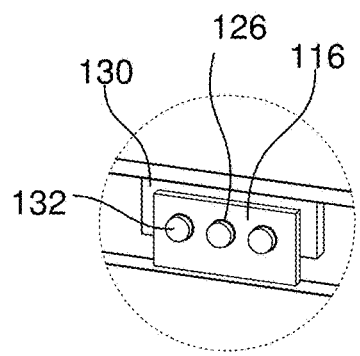
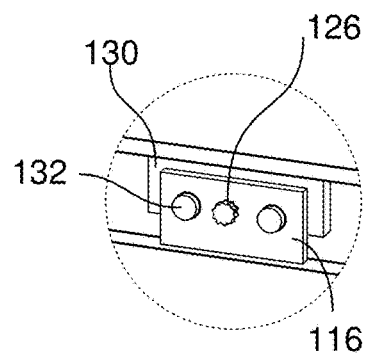
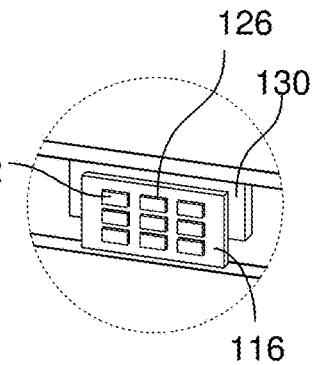
FIG. 3A  FIG. 3B  FIG. 3C
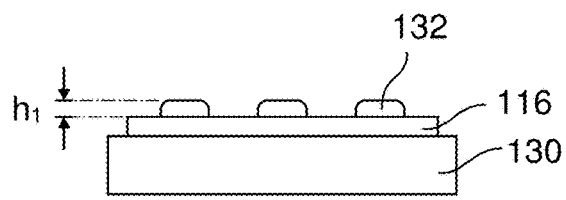
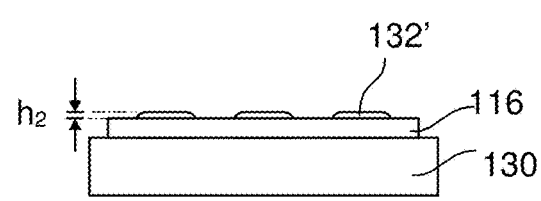
FIG. 3D  FIG. 3E
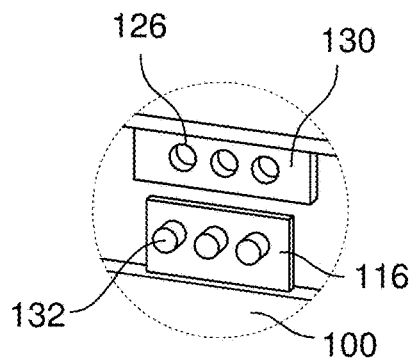
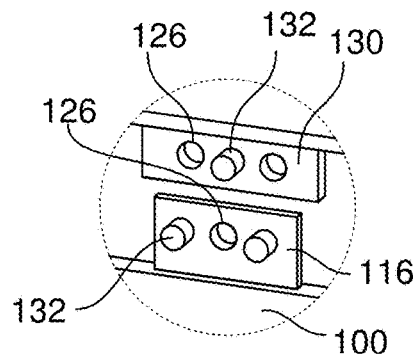
FIG. 4A  FIG. 4B

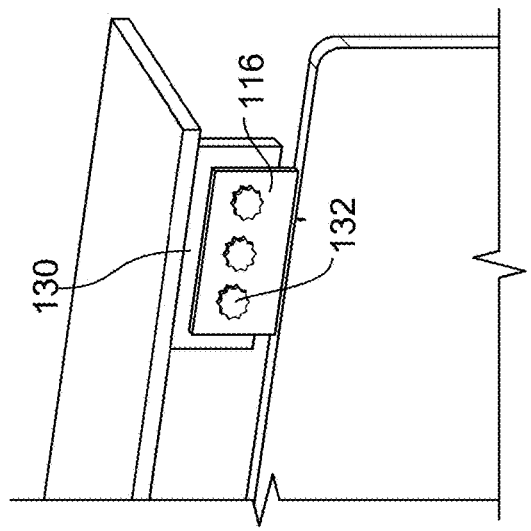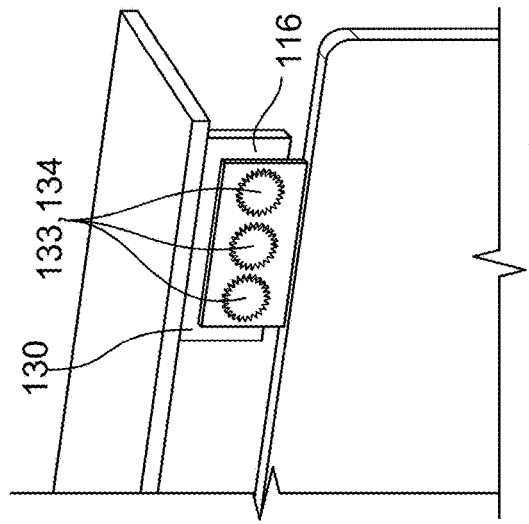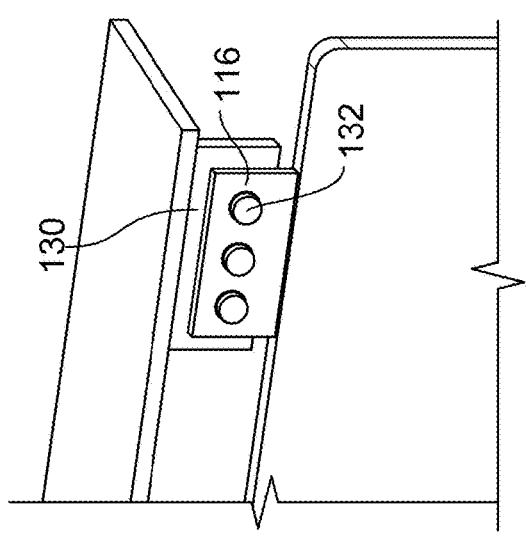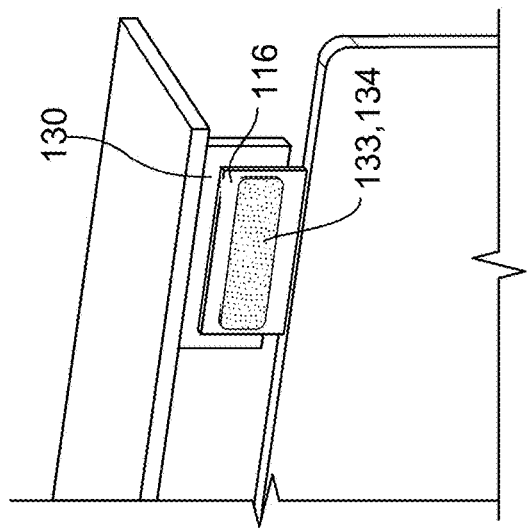

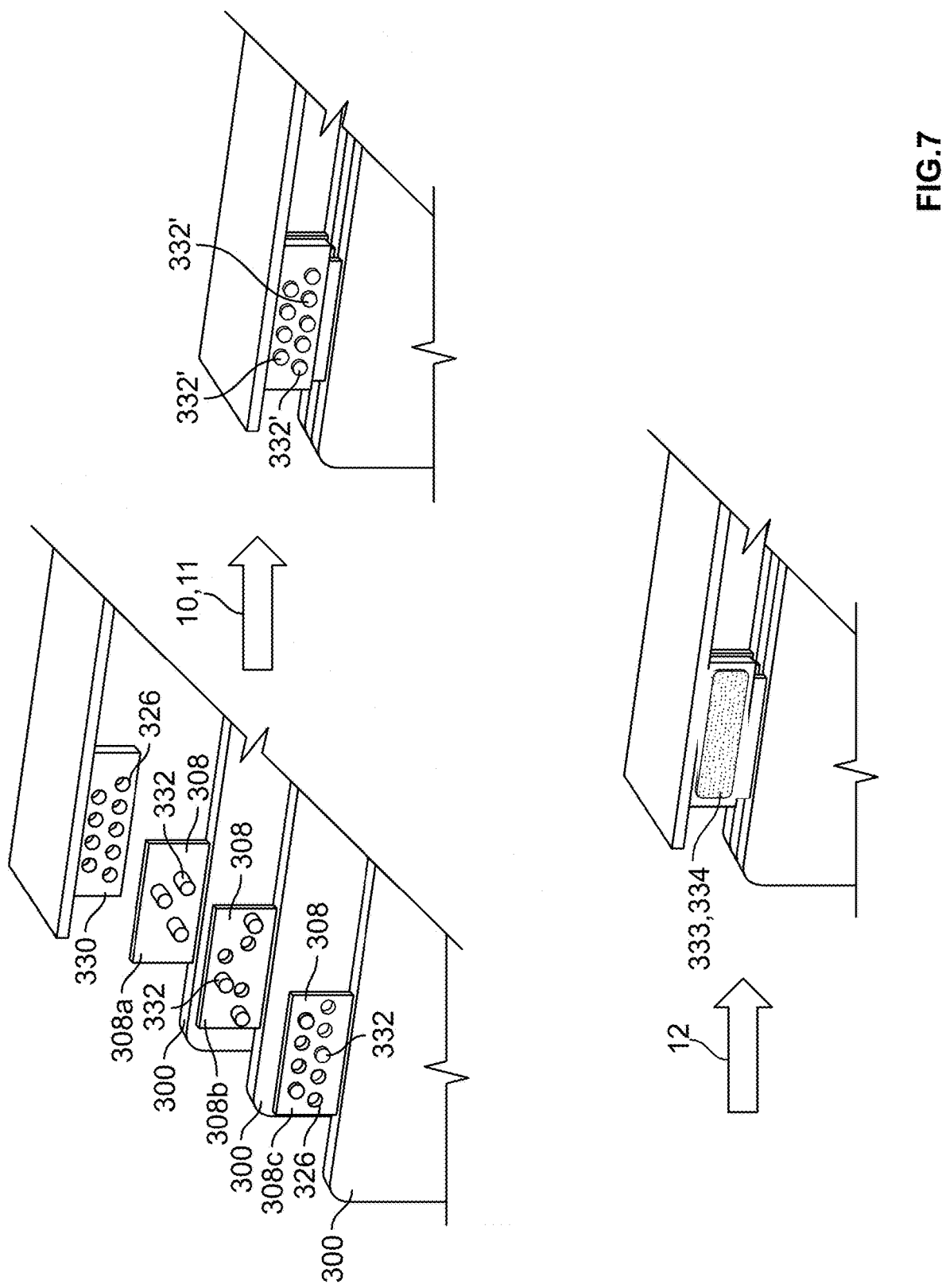

ELECTRICAL INTERCONNECTS FOR BATTERY CELLS

TECHNICAL FIELD

The disclosure relates to ion pouch battery cells and methods of producing the same.

BACKGROUND

Lithium ion pouch cells have been utilized in a variety of industries including automotive applications. The pouch cell designs are attractive due to their reduced weight and cost as well as optimized packaging efficiency at the battery level, higher specific density, and higher voltage output per cell than many other systems. Thus, lithium ion power systems have become the primary choice for many applications. Traditional electrical interconnects of the pouch cells are formed as fastened threaded studs or ultrasonically welded tabs which may experience mechanical inconsistencies, high contact resistance, bond non-uniformities, and other issues.

Alternative methods such as thermal spray deposition have been developed to provide battery interconnects. Yet, these methods such as arc spray or plasma spray subject the pouch cell to temperatures of up to 20,000° C. Additionally, bonds produced by thermal spray deposition may suffer from oxide depositions.

SUMMARY

In at least one embodiment, a battery pack is disclosed. The battery pack includes a pouch cell having electrode tabs extending therefrom, each of the tabs defining a plurality of perforations. The battery pack further includes a busbar including a plurality of raised portions in contact with and protruding through the perforations. The battery pack also includes an agglomeration of mechanically bound solid metal particles overlaying the raised portions to mechanically bind and electrically connect the tabs to the busbar. Each of the raised portions may be in contact with at least one of the perforations. The agglomeration may form a continuous strip. The perforations and raised portions may have a same shape. Each of the raised portions may include an edge extending beyond a boundary of a corresponding one of the perforations. The raised portions may be arranged in a regular pattern. The agglomeration is free of voids, oxide inclusions, or both. The tab may be L-shaped.

In another embodiment, a battery pack is disclosed. The battery pack may include a pouch cell having electrode tabs extending therefrom, each of the tabs defining a plurality of raised portions. The battery pack may also include a busbar including a plurality of perforations in contact with and coupled to the raised portion. The battery pack may further include an agglomeration of mechanically bound solid metal particles overlaying the raised portions to mechanically bind and electrically connect the tabs to the busbar. Each of the raised portions may be in contact with one of the perforations. The agglomeration may form a continuous strip. The perforations and raised portions may have a same shape. Each of the raised portions may include an edge extending beyond a boundary of a corresponding one of the perforations. The raised portions may be arranged in a regular pattern. The agglomeration is free of voids, oxide inclusions, or both. The tab may be L-shaped.

In a yet another embodiment, a battery pack is disclosed. The battery pack includes a perforated busbar. The battery pack also includes a pair of pouch cells, each having a tab extending therefrom, arranged adjacent to one another such that the tabs are aligned and interconnect, each of the tabs having raised portions protruding through one or more openings in the busbar. The battery pack additionally includes an agglomeration of mechanically bound solid metal particles overlaying the raised portions to mechanically bind and electrically connect the tabs to the busbar. At least one of the tabs may further include one or more perforations configured to house protrusions of an adjacent tab. The agglomeration may form a continuous strip. Each of the raised portions may include an edge extending beyond a boundary of a corresponding one of the openings.

BRIEF DESCRIPTION OF THE DRAWINGS

FIGS. 3A-3C depict detailed example perforations and raised portions patterns on tabs and busbars, respectively, depicted in FIG. 2;

FIG. 3D shows a detailed side view of the raised portions depicted in FIG. 3A prior to mechanical connection to the surface area of the tab;

FIG. 3E shows a detailed side view of the raised portions depicted in FIG. 3A after mechanical connection to the surface area of the tab;

FIGS. 4A and 4B depict alternative detailed example perforations and raised portions patterns on busbars and tabs, respectively, depicted in FIG. 2;

FIG. 5A shows a perspective view of a portion of a battery pouch cell having a tab with perforations and a portion of a busbar having a set of raised portions aligned with the perforations prior to mechanical connection;

FIG. 5B shows the raised portions of FIG. 5A after mechanical connection;

FIGS. 5C and 5D show alternative non-limiting examples of agglomerations applied onto the raised portions depicted in FIG. 5B;

FIG. 7 shows a series of steps to connect a busbar to multiple battery pouch cells via their tabs;

DETAILED DESCRIPTION

Figure 1A:
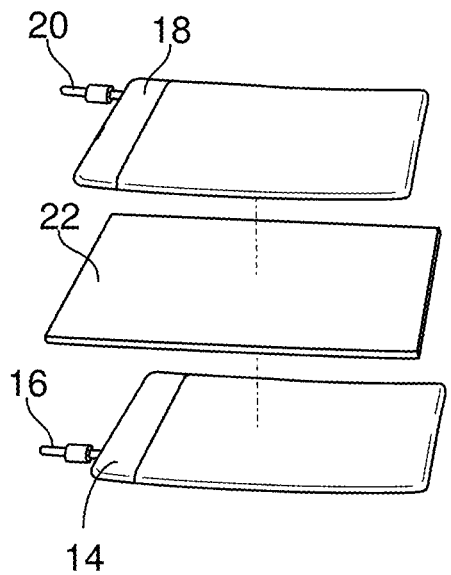
FIG. 1A depicts an exploded view of individual layers within a pouch cell battery depicted in FIG. 1B.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

With mass-production of batteries, a variety of battery formats have been developed. Example battery formats include cylindrical cells, button cells, prismatic cells, and pouch cells. The pouch cell design represents an efficient use of space and achieves about 90-95% packaging efficiency. Instead of using a metallic cylinder and glass-to-metal electrical feed-through, conductive foil tabs are typically welded to the electrodes and are fully sealed while extending outside of the pouch. By eliminating a metal enclosure, the weight of the pouch cell is reduced.

While a pouch cell is a lightweight solution to the battery design, the pouch format presents a number of considerations such as requirement for support and space to expand. Additional concerns are exposure to humidity and high temperatures which may shorten life of the cell. Swelling represents yet another concern, for example swelling by up to 8-10% over 500 cycles may be typical with some types of pouch cells. Yet, pouch cells have become popular, especially in the same performance criteria as cylindrical cells. Pouch cells have been successfully utilized in consumer, military, as well as automotive applications. Relatively large flat pouch cell packs have been applied in electric powertrains and Energy Storage Systems. Relatively small pouch cells have been used for portable applications with high load current requirements.

Figure 1B:
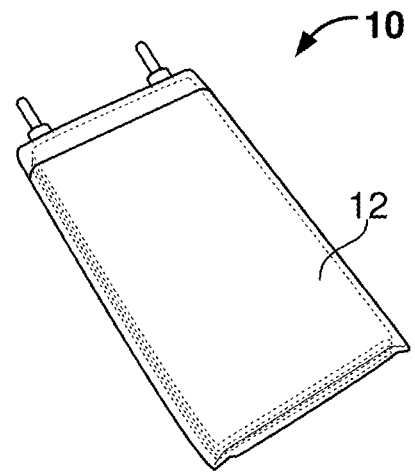
FIG. 1B depicts a perspective view of an example pouch cell battery.

An example lithium-ion pouch cell 10 is depicted in FIGS. 1A and 1B. As can be seen in FIGS. 1A and 1B, a pouch cell 10 has a laminated architecture in a pouch 12. The pouch 12 includes a cathode 14 with a battery tab or terminal 16, an anode 18 with a battery tab or terminal 20, and a separator 22 sandwiched between the cathode 14 and the anode 18. The layers 14, 18, and 22 are aligned and stacked or folded. After the layers 14, 18, 22 are assembled together and inserted into the pouch 12, the pouch 12 is filled with electrolyte and subsequently sealed in such as a way that the tabs 16 and 20 are outside of the pouch 12.

The pouch cells 10 are typically lithium-ion batteries with liquid electrolyte. The electrolyte may be gelled via an addition of a polymer additive. The cells 10 are also called LiPo for lithium polymer. Yet, a variety of alternative lithium-ion electrochemistries may be employed. The tabs, or terminals, 16, 20, of the lithium-ion pouch cell 10 usually have different chemistries because they are internally connected to the cathode 14 and anode 18 which are formed from dissimilar metals. The current collectors, the cathode 14 and the anode 18, are typically made from copper, aluminum, or nickel foils. The tabs 16, 20 are usually formed from the same metal as the respective electrode 14, 18 to avoid creation of a galvanic cell between the electrode and the tabs. Yet, the presence of tabs 16, 20 formed from dissimilar metals presents a challenge when the tabs 16, 20 are to be connected to a busbar due to metal incompatibility which may lead to higher incidence of corrosion, increased resistance, and a lack of joint robustness.

The electrode interconnects between the tabs and the busbar have traditionally consisted or either fastened threaded studs or ultrasonically welded tabs. The latter exhibits a number of issues such as inconsistent bond uniformity and apparatus (horn and anvil) fatigue issues. Using the fastened threaded studs, on the other hand, may result in mechanical failure and high contact resistance.

To avoid the above-mentioned disadvantages, thermal spray deposition techniques have been utilized to form the interconnects between the busbar and the electrode terminals. Many of the methods utilize high-temperature thermal spray processes to deposit the solderable material. The thermal spray deposition techniques are generally processes enabling layering of a wide range of feedstock material on a substrate at high deposition rates. Yet, the methods employ relatively high temperatures causing the material to melt. In thermal spray processes, the bonding mechanism is mechanical interlocking, and the bonding may be improved by increasing temperature or particle velocities. But the high processing temperatures generally increase the amount of oxides embedded in the coating, reduce the coating's performance for structural applications, and potentially damage the cell. For example, the cell separator 22 usually has a relatively low temperature tolerance which limits the applicable processes. Example thermal spray techniques and the temperature ranges typically associated with them include a plasma spray process with temperatures between 9,727° C. (10,000 K) and 19,727° C. (20,000 K), wire arc with temperatures of about 14,727° C. (15,000 K), detonation gun deposition utilizing temperatures of about 5,227° C. (5,500 K), or high velocity oxyfuel deposition (HVOF) with temperatures of about 5,227° C. (5,500 K).

Therefore, it would be desirable to provide electrode terminal-busbar interconnects applied in a way which would eliminate high-wear tooling components such as horn and anvil from the assembly process, alleviate interfacial debonding and through-thickness fractures which are typical for ultrasonic welding, reduce degradation and parasitic inductance by producing dense, layered coatings with low porosity and oxidation, and provide superior corrosion resistance and low electrical resistance while maintaining such process temperatures which would prevent destruction of the cell or creation of oxide inclusions. Additionally, it would be desirable to provide mechanically robust electrode terminal-busbar interconnects.

Figure 2:
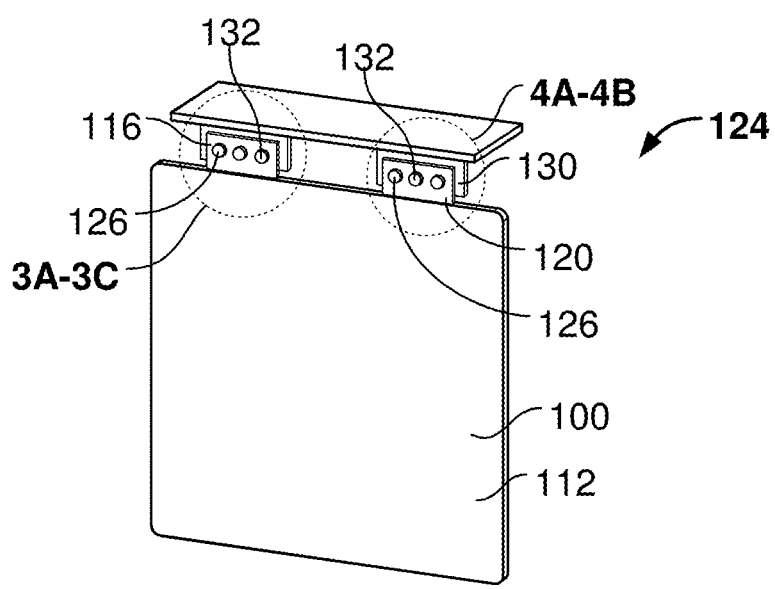
FIG. 2 depicts a perspective view of an example pouch cell connected to an example busbar according to one or more embodiments.

In one or more embodiments, depicted in FIG. 2, a battery pack 124 is disclosed. The battery pack includes a pouch cell 100 with the cathode tab 116 and an anode tab 120 extending from the pouch 112. The tabs 116, 120 are aligned with a busbar 130 such that the tabs 116, 120 are in contact with the busbar 130. The tabs 116, 120 may be made from copper, aluminum, nickel, zinc, lead, the like, or a combination thereof. A protective layer may be formed on the surface of the one or more tabs to promote bonding of the tabs to the busbar. The protective layer may include nickel, titanium, zinc, silver, gold, tin, the like, or a combination thereof. The tab 116 may be made from the same or different material as the tab 120. The surface of either or both of the tabs 116, 120 may be at least partially smooth or textured to increase surface area for the bond between the tabs 116, 120 and the busbar 130. Any discussion and figures herein relating to just one of the tabs, 116 or 120, likewise relate to the other tab even if the other tab is not explicitly mentioned.

The tabs 116, 120 include one or more perforations, apertures, or openings 126. A plurality of perforations 126 may contribute to better heat conductance than presence of just a single perforation 126. Additionally, providing a plurality of perforations 126 increases the number of sites for joining to the busbar 130, which in turn contributes to increased joint robustness and lessens a chance of attachment failure between the tabs and the busbar.

The tabs 116, 120 may include the same or different number of perforations 126 having the same or different shape, cross-section, dimensions, orientation, and other properties. Example perforations 126 are depicted in FIGS. 3A-3C. While FIGS. 3A-3C depict the tab 116 and perforations 126, the tab 116 and perforations 126 are just examples, and the description is applicable to any tab and perforation described herein. As can be seen in FIG. 3A, the tab 116 may include perforations 126 which are regularly spaced apart from each other. The perforations 126 may have a cross section which is a circle, a semi-circle, an oval, a semi-oval, a square, a rectangle, a pentagon, a heptagon, an octagon, a nonagon, a trapezium, a triangle, a star, a quatrefoil, a kite, a regular shape, an irregular shape, a symmetrical shape, an asymmetrical shape, the like, or a combination thereof. The perforations 126 may have a perimeter 128 which is smooth, rugged, ridged, coarse, jagged, the like, or a combination thereof. In one or more embodiments, some of the perforations 126 may have a perimeter 128 which is not smooth. Alternatively, some perforations 126 may include smooth portions and coarse portions. The coarseness may provide additional surface area for bonding. An example smooth edge 128 may be seen in FIG. 3A, and an example jagged edge 128 can be seen in FIG. 3B. The tab 116 may include one or more rows of perforations 126. Single-row perforation tabs 116 are depicted in FIGS. 3A and 3B while an example of a multi-row perforation tab 116 is depicted in FIG. 3C.

The perforations 126 may constitute about less than 5%, 5%, 10%, 20%, 30%, 40%, 50% or more of the surface area of the tab surface area. The dimensions of a perforation 126 may differ from dimensions of at least one other perforation 126. Alternatively, all perforations 126 may have the same dimensions. All of the tabs 116, 120 may have the same pattern of perforations 126. The pattern may be regular or irregular, symmetrical, or asymmetrical. Alternatively, a tab may include a different pattern of perforations 126 than at least one other tab. Providing the same pattern of perforations 126 for all the tabs may simplify the manufacturing process. Yet, customization is contemplated and varying patterns may be beneficial, for example, if respective tabs vary in thickness and/or composition of material. The perforations 126 in the tabs may be provided by a number of techniques, for example by stamping, punching, blanking, embossing, by another type of pre-handling, or a combination thereof.

FIGS. 3A-3C further illustrate a busbar having one or more raised portions, projections, or protrusions 126. All the raised portions 132 arranged on the same busbar 130 may have the same shape, as can be seen in FIG. 3A. Alternatively, at least one raised portion 132 may have a different shape, as is illustrated in FIG. 3B.

The description of the perforations 126 above likewise relates to the raised portions 132 with regards to their amount, shape, configuration, dimensions, surface area coverage, and other properties. The raised portions 132 may have the same or substantially the same shape or cross-section as the corresponding perforations 126 such that the raised portions 132 may protrude through the perforations 126. For example, if the perforation is circular, the raised portion may be circular. If the perforation is star-shaped, the raised portion may be star-shaped or circular, and the like.

The raised portions 132 and the perforations 126 may be configured as mating parts such that their shape and dimensions match and the raised portions 132 and corresponding perforations align. The dimensions of both the perforations 126 and the raised portions 132 should be such that the raised portions 132 fit through the perforations 126 and may penetrate through the perforations 126 leaving no gap between the raised portion 132 and the edge of the respective perforation 126. Alternatively, a gap may be present between the edge of the perforation 126 and an edge of the corresponding raised portion 132. The gap may be temporary.

All the raised portions 132 may have uniform dimensions such as height, dimeter, or the like. Alternatively, the raised portions may have one or more non-uniform dimensions such that at least one of the raised portions 132 has a different height than the remaining raised portions 132. Alternatively, or in addition, at least one of the raised portions 132 may have a different height in the center than at the edges. For example, the raised portion 132 may form a peak such that the central part, having the greatest height, continuously slopes towards the edges, having the lowest height. Alternatively, the edges may have a greater height than the central portion, the raised portion forming a bowl-shaped protrusion.

The height of the raised portion 132 is such that the raised portion 132 protrudes above the surface of the tab after the raised portion 132 protrudes through the perforation 126. The height may be substantially the same as the thickness of the tab 116. Alternatively, the height may be greater than the thickness of the tab. The height of the raised portion 132 may be once, twice, three, four, five, six, times greater than thickness of the tab 116.

The raised portions 132 may be formed from the same material as the busbar 130. The raised portions 132 may be stamped into the busbar material. The raised portions 132 may form an integral portion of the busbar 130. Alternatively, the raised portions 132 may be attached to the busbar 130 by any suitable technology, for example by physical vapor deposition which is described herein such as an agglomeration is formed between the one or more raised portions 132 and the busbar 130. Thus, the raised portions 132 may be formed from a different material than the busbar 130. Each raised portion 132 may be made from the same or different material.

Once the raised portions 132 are inserted through the corresponding perforations 126, the raised portions 132 are mechanically connected to the surface area of the corresponding tab 116. The tab surface area may be smooth. Alternatively, the tab surface area may have a rough or coarse surface to increase surface area for bonding. The mechanical connection may be provided by applying pressure to the raised portions 132 which become mechanically connected raised portions 132'. As a result of the mechanical connection, the height of the raised portions 132 may be reduced, the width of the raised portions 132 may be increased, the shape or cross/section of the raised portion 132 may be altered, or a combination thereof. At least one of the outer edges of the raised portion 132' may extend beyond at least one of the edges of the corresponding perforation 126. For example, the entire outer edge of the raised portion 132' may extend beyond the entire edge of the perforation 126. If a gap is present between a perforation 126 and a raised portion 132, the pressure may force a part of the raised portion material into the gap such that the gap is entirely filled with the raised portion 132' material. In one or more embodiments, the raised portions 132 are substantially flattened such that the raised portions 132' protrude above the surface of the tab in significantly lesser manner than prior to the mechanical connection. For example, the mechanical connection may reduce the height of the raised portion 132' by about less than 5, 5, 10, 20, 30, 40, 50, 60, 70, 80, 90, 100%, or more compared to the height of the same raised portion 132 prior to the mechanical connection. FIG. 3D shows a set of three raised portions 132 on a busbar 130 depicted in FIG. 3A after the raised portions 132 are aligned with the perforations in the tab 116. In FIG. 3E, the same raised portions 132' are depicted after being mechanically connected to the tab 116 material. The height $h_1$ of the raised portion 132 prior to mechanical connection is greater than the height $h_2$ of the raised portion after mechanical connection.

While the perforations 126 are described above as being a part of the tab 116, 120, and the raised portions 132 being a part of the busbar 130, in at least one embodiment, the perforations 126 may be arranged on the busbar 130 and the corresponding raised portions 132 may be configured as part of the tab 116, 120. An example of such embodiment is captured in FIG. 4A. In a yet another embodiment, illustrated in FIG. 4B, a tab 116, 120 may include both one or more perforations 126 and one or more raised portions 132. The corresponding raised portions 132 and perforations 126 are arranged on the corresponding busbar 130 to be connected to the tab 116, 120.

Once the raised portions 132 are inserted through the respective perforations 126, example of which is shown in FIG. 5A, and mechanically connected to each other, shown in FIG. 5B, to form raised portions 132', one or more agglomerations 134 of mechanically bound solid metal particles are applied over the raised portions 132 to facilitate bonding of the tabs 116, 120 to the busbar 130. As was mentioned above, the tab surface area may be coarse to increase surface area for bonding. The entire surface area of the tab may be coarse. Alternatively, only a portion of a tab may be coarse, the portion including the one or more areas onto which one or more agglomerations 134 are to be applied. If the perforations 126 are present on the busbar 130 instead of or in addition to the tab, the surface area of the busbar 130 may be coarse as was described above with respect to the surface are of the tab 116.

The agglomeration 134 thus forms interconnects 133 which electrically connect the tabs 116, 120 to the busbar 130. Example agglomerations are shown in FIGS. 5C and 5D. The raised portions 132' may be partially overlaid with the agglomerated material 134 such that at least a portion of a raised portions 132 remains free of the agglomerated material 134. Yet to increase the robustness of the connection, the entire surface area of the raised portions 132' and a surrounding area may be covered with the agglomerated material 134. The surrounding area may extend to at least one side of the busbar 130 or tab 116, 120. In at least one embodiment, a diameter of an agglomeration 134 may be greater than a diameter of the perforation 126, the raised portion 132, the mechanically connected raised portion 132', a set of raised portions 132', or a combination thereof. The agglomeration 134 may be continuous or discontinuous.

The agglomeration 134 may cover at least a portion of the tabs 116, 120 and/or busbar 130. The same agglomeration 134 may cover one or more or all raised portions 132' of each tab or busbar. Alternatively, one agglomeration 134 may cover just one raised portion 132' and/or perforation 126.

When a busbar 130 or a tab 116, 120 includes both perforations 126 and raised portions 132, as is depicted in FIG. 4B, an agglomeration 134 is applied over both the raised portions 132' and the perforations 126. The agglomeration 134 may form a continuous strip. Alternatively, each raised portion 132' and perforation 126 may be covered by a respective agglomeration 134. The shape and dimensions of the agglomeration 134 may be the same or different in the same battery cell and/or the same battery pack. The agglomeration may be configured as a strip, rectangle, square, triangle, circle, semi-circle, oval, semi-oval, crescent, star, a regular shape, an irregular shape, pentagon, hexagon, heptagon, octagon, the like, or a combination thereof. The shape of the agglomeration may be the same or different as the shape of the perforation 126, the raised portion 132, the mechanically connected raised portion 132', or a combination thereof.

Figure 6A:
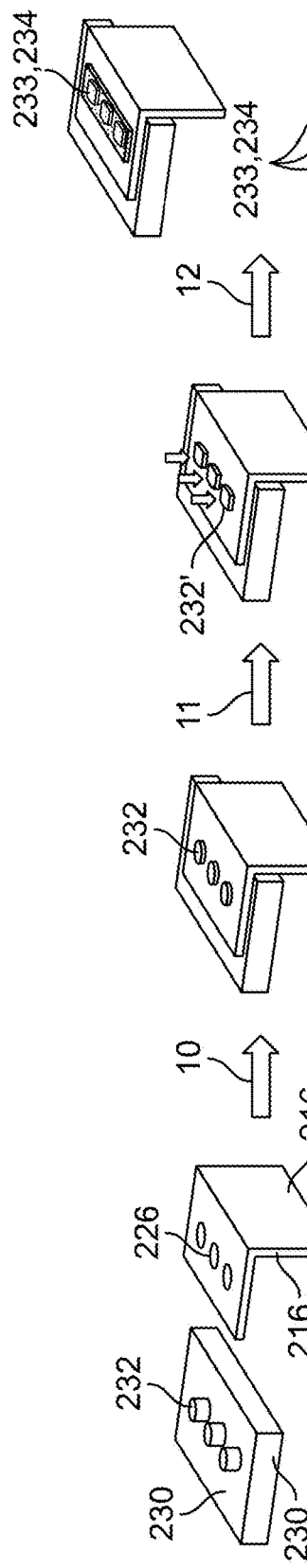
FIG. 6A shows a series of steps to connect a busbar to an L-shaped battery cell tab.

The tab 116 and the busbar 130 may have a variety of shapes and configurations. For example, the tab, the busbar, or both may be configured to further increase robustness of the busbar-tab connection. In at least one embodiment, the tab 216 may be L-shaped, as is depicted in FIG. 6A. FIG. 6A shows a sequence of steps of producing a mechanically robust busbar-tab connection of a battery cell (not depicted). At step 10, a busbar 230 having a set of three spaced-apart raised portions 232 is aligned with a cell tab 216 having a set of three perforations 226 corresponding to the raised portions 232 in shape and dimensions. At step 11, the raised portions 232 are mechanically connected to the tab material. At step 12, an agglomeration 234 is applied either as a continuous spray or pulsed spray.

Figure 6B:
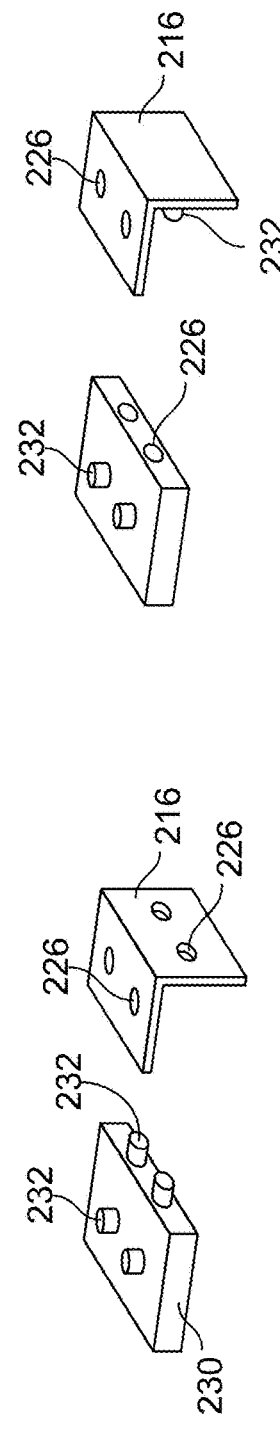
FIGS. 6B-6D show alternative non-limiting example embodiments of the L-shaped battery cell tab to be connected to a corresponding busbar.
Figure 6C:
Figure 6D:
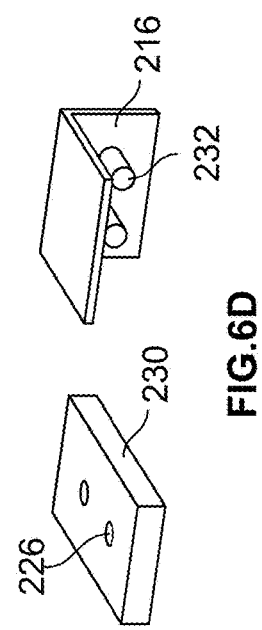

In an alternative embodiment shown in FIGS. 6B-6D, more than one side of the busbar 230, the tab 216, or both may include one or more perforations 226, raised portions 232, or both.

In another embodiment, depicted in FIG. 7, a set of battery pouch cells 300 is disclosed. Each pouch cell 300 has a tab 308 extending therefrom. The tab 308 may be a cathode tab 316 or an anode tab 320. The tab 308 has one or more raised portions 332. The number of raised portions 332 on each tab 308 may be the same or different. In addition, some of the tabs 308 include perforations 326. At least some of the perforations 326 of different tabs align with each other. The number of perforations 326 increases in one direction from the tab 308a to the tab 308c such that the tab 308c closest to the busbar 330, after alignment, includes the most perforations 326. The perforations 326 on the tab 308c accommodate raised portions 332 of the other tabs 308a, 308b. Thus, the configuration of the perforations 326 and raised portions 332 on each tab 308 is such that the raised portions 332 in the tab 308a fit in the perforations 326 of the tabs 308b and 308c. The raised portions 332 of the tab 308b fit in the perforations 326 of the tab 308c.

At step 10, the tabs 308a, 308b, and 308c are aligned and interconnected in such a way that the raised portions 332 of all three tabs 308 fit through the perforations 326 of the tab 308c. The aligned group of tabs 308 is then aligned with the busbar 330 such that the perforations 326 of the busbar 330 accommodate the raised portions 332 of the tabs 308a, 308b, and 308c. At step 11, the raised portions 332 are mechanically attached to the busbar material. At step 12, an agglomeration is applied as an overlayer, covering all the raised portions 332 and a surrounding area. The agglomeration 334 of solid metal particles is mechanically bound to the tabs 308 and to the busbar 330.

Figure 8A:
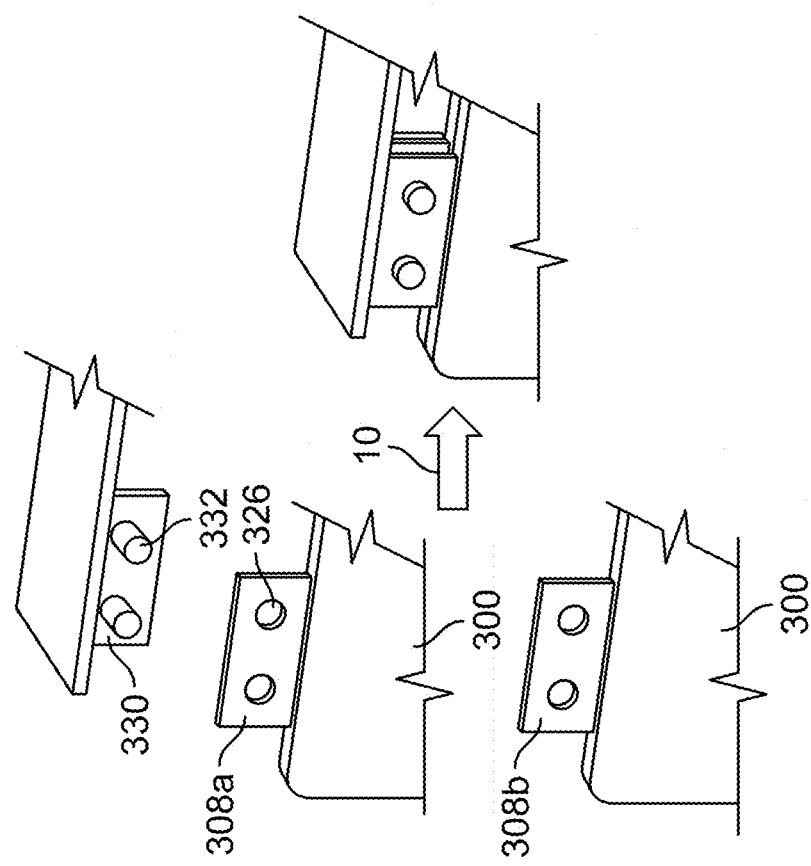
FIGS. 8A and 8B show alternative non-limiting examples of aligning a busbar with multiple battery pouch cell tabs.

While a continuous strip of a singular agglomeration is depicted in FIG. 7, pulsed spray is an alternative. Likewise, while the raised portions 332 are arranged on the tabs 308, in an alternative embodiment, the busbar 330 may include raised portions 332 which align with the perforations 326 of the tabs 308 in a variety of ways. An example embodiment is depicted in FIG. 8A, showing a busbar 330 having two raised portions 332 which in step 10 align with two cell tabs 308a and 308b, the tabs 308a, 308b being aligned side by side. Each cell tab includes one perforation 326 each. The tabs align next to each other on the busbar 330 in such a way that each perforation 326 of the two tabs 308a and 308b houses or accommodates one of the two raised portions 332 of the busbar 330.

Figure 8B:
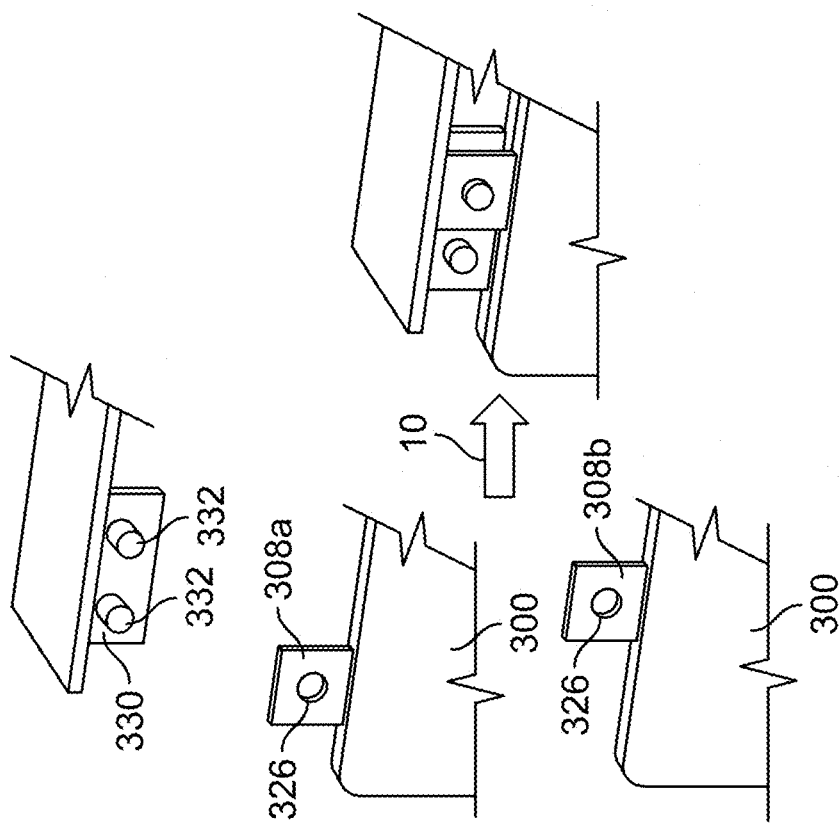

In a yet alternative embodiment depicted in FIG. 8B, two cells tabs 308a and 308b, each contain two perforations 326. The two cells tabs are stacked and aligned in step 10 in such a way that the two raised portions 332 protrude through both perforations 326 of both cell tabs 308a and 308b.

Dimensions and shape of the tabs 308 and the dimensions, shape, and location of the agglomerations 334 may be the same or differ throughout the battery pack and may be those described above. The differing dimensions may be the height, width, thickness, diameter, or a combination thereof. The dimensions of the tabs 308 may differ as long as all the tabs 308 have a direct contact with the busbar 330. The direct contact may be via raised portions 332, perforations 326, the tab surface area, the busbar surface area, or a combination thereof. The height, width, diameter, and/or thickness of the tabs 308 may be smaller than the height, width, diameter, and/or thickness of the busbar 330. The height, width, and/or thickness difference between the smallest and the greatest tab 308 may be about less than 10%, 10%, 20%, 30%, 40%, 50%, 60% or more.

The agglomerations 134, 234, 334 form the battery interconnects 133, 233, 333. The interconnects are thus formed as an agglomeration of solid particles mechanically bound to each other and the substrate via plastic deformation. The substrate includes the busbar, the tabs, the raised portions, and perforations, or a combination thereof. The agglomeration of particles may be formed using a cold spray deposition method also called gas dynamic cold spray (GDCS). The cold spray deposition is an impact consolidation method. The cold spray deposition differs from hot spray processes mentioned above by using a much lower temperature such as ambient temperature of about 24° C. (297.15 K) to about 80° C. (353.15 K) such that the material which is being deposited onto a substrate remains in a compliant, but solid state. The temperature may be increased beyond the range named above to achieve higher pliability and softness of the particles as long as the elevated temperature is below the melting point of the particles and the substrate. Thus, the cold spray deposition is a process of depositing particles without a phase change. Since there is no phase change, all particles in the agglomeration have the same thermo-mechanical history which leads to uniform properties of the interconnects.

Figure 9:
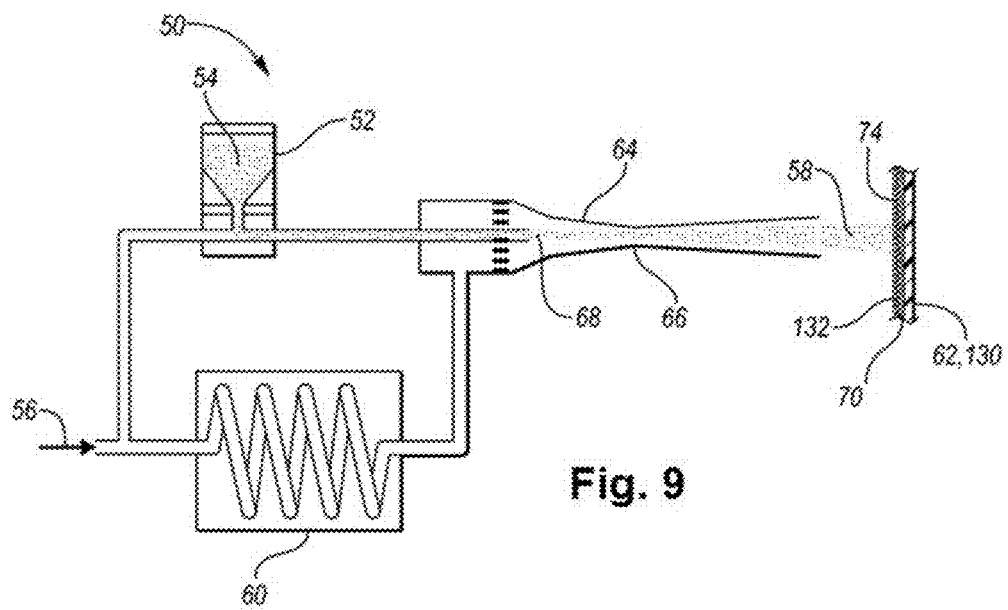
FIG. 9 shows a schematic view of an example cold spray system including an agglomerate-substrate interface produced in a cold spray system.
Figure 10A:
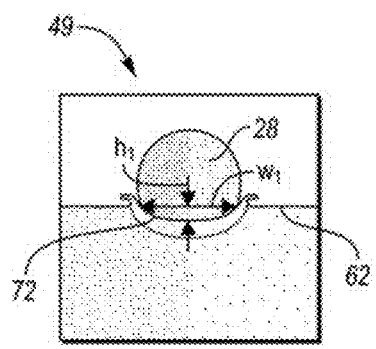
FIGS. 10A-10D depict changes in a particle-substrate interface upon impact of a solid particle with a surface of a substrate during a cold spray deposition process.
Figure 10B:
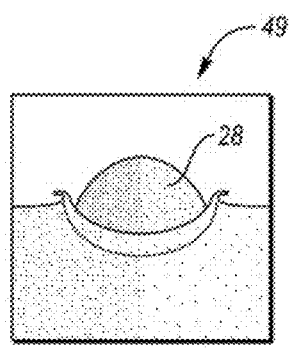
Figure 10C:
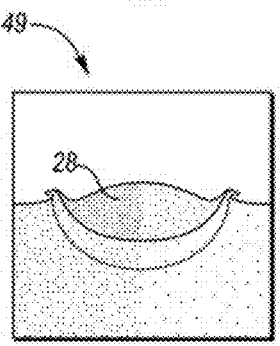
Figure 10D:
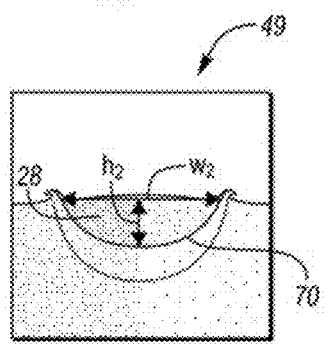

During a cold spray deposition process, powdered metal particles are deposited on a substrate by ballistic impingement at supersonic velocities to form a layered coating or a free-form structure. An example schematic depiction of a cold spray system 50 can be seen in FIG. 9. The system 50 includes a powder feeder 52 for accepting a powder feed 54 having particle size of about 1-100 µm in diameter. The feed 54 may be a powder including metals such as Mg, Al, Si, Sc, Ti, V, Cr, Mn, Fe, Co, Ni, Cu, Zn, Zr, Nb, Mo, Rh, Pd, Ag, In, Sn, Hf, Ta, W, Ir, Pt, Au, Re, polymers, ceramics, composite materials, metal matrix composite materials, nanocrystalline materials, or a mixture thereof. Individual particles of the feed may be soft, hard, rigid, smooth, rough, or the like.

Example powder feed rate may be 1-10 pounds/hour. The system 50 further includes a gas inlet 56 for supplying gas capable of entraining the solid particles 58. The gas may be, for example, $N_2$, He, their mixture, or the like. A heater 60 is provided for heating the entraining gas to about 100-500° C. to increase ductility of the particles 58 to be deposited onto the substrate 62. The gas flow rate may be about 30-100 CFM. The powder feed 54 is inserted at high pressure and temperature at the entrance of the supersonic nozzle 64. The gas expands and accelerates through the nozzle 64 as its temperature decreases. Rapid changes take place at the nozzle throat 66, where gas supersonic velocity is reached. The velocity and temperature of the solid particles 58 approach gas values as heat transfer occurs.

The high pressure and temperature produced within the cold spray system 50 are capable of yielding supersonic gas velocities such as about 300-1500 m/s and high particle acceleration within the gas stream 68. The solid particles 58 are entrained within the gas stream 68 and directed towards the substrate 62, where they embed on impact and form a strong bond with the surface of the substrate 62. The kinetic energy of the particles 58, supplied by the expansion of the gas, is converted to plastic deformation energy during bonding. To achieve particle consolidation with the surface, a critical velocity must be reached before impact of the particles 58 with the substrate 62. The critical velocity differs depending on the feed type. Because the particles 58 remain in their solid state and undergo plastic deformation, their shape may become lenticular on impact, as is depicted in FIGS. 10A-10D.

FIGS. 10A-10D illustrate a sequence of changes at the particle-substrate interface 70 upon the solid particle's 58 impact with the surface of the substrate 62. As can be seen in the FIGS. 10A-10D, when the particle 58 encounters the substrate 62, the particle 58 flattens while a crater 72 forms in the substrate 62. The depth and width of the crater 72 increases with time such that $w_1<w_2$ and $h_1<h_2$. At the same time, the temperature at the impact zone rises, the rise being concentrated at the particle-surface interface 70. Yet, the discrete crystalline structure of the solid particle 58 is preserved upon impact. The resulting connection between the solid particles 58 and the substrate 62 produces a mechanical mixing at the particle-substrate interface 70 similar to explosive bonding.

Figure 11:
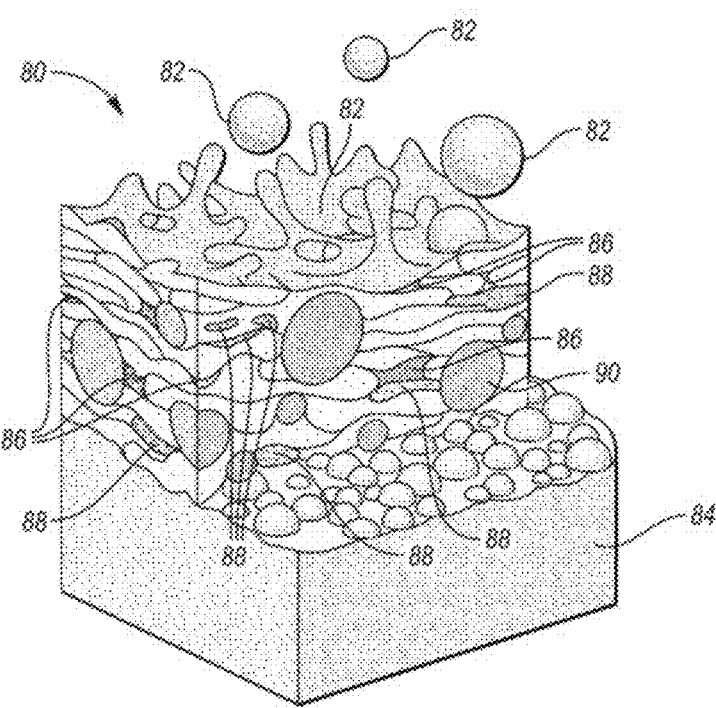
FIG. 11 depicts a perspective schematic view of a coating-substrate interface produced by a thermal spray deposition process.

In contrast to the cold spray deposited particles 58 depicted in FIGS. 10A-10D, a coating-substrate interface 80 of thermally sprayed molten particles 82 deposited on a substrate 84 is illustrated in FIG. 11. The resulting structure includes molten particles/material 82, voids 86, as well as oxide inclusions 88, and unmelted particles 90.

Figure 12:
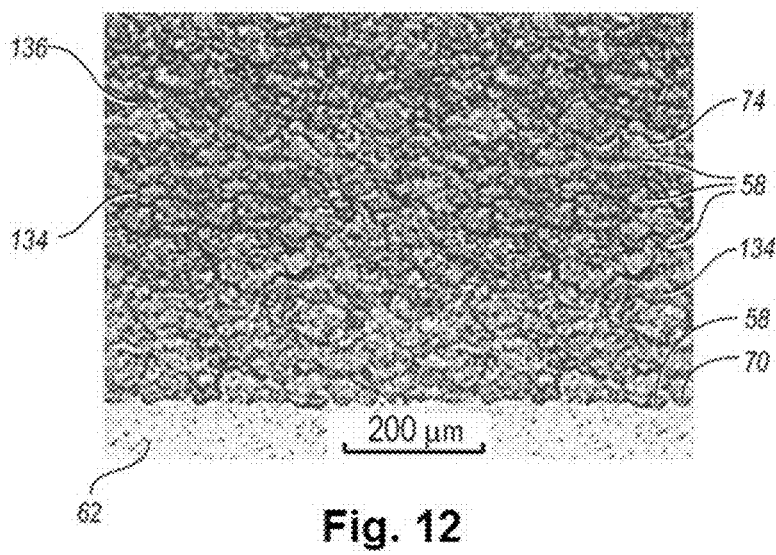
FIG. 12 depicts a schematic detailed view of the agglomerate-substrate interface forming interconnects disclosed herein.

Advantageously, the mechanical mixing of cold spray deposition does not allow for presence of voids, typically associated with the coating-substrate interface 80 created by the thermal spray processes, at the particle-substrate interface 70. An example consolidated deposit of solid powder particles 58 forming the interconnects, described herein, as a void-free structure can be seen in FIG. 12. As can be further seen in FIG. 12, the thickness of the deposited particle layer, or the agglomerate 134, may be increased by supplying an additional amount of solid particles 58. In the formed agglomeration 134, the additional amount of particles 58 mechanically mix with the already deposited solid particles 58. No voids are created within the agglomerate 134. The particle-substrate interface 70 as well as the particle-particle interface 74 are free of voids and oxide inclusions.

Since the interconnects 133, 233, 333 may be made from materials that are sensitive to the presence of oxygen and will readily oxidize at elevated temperatures, such as copper and aluminum, the thermal spray processes may produce interconnects of inferior quality. Yet, melting of the particles that occurs during most thermal spray processes, and which may result in oxidation of the coating and the substrate and thus lower performance of the module, is not present in the cold spray process. The agglomerate 134 and the particle-substrate interface 70, produced during the cold spray process, are thus free of oxide inclusions which could otherwise decrease the adhesive and cohesive strength of the coating 136 forming the interconnects 133, 233, 333. The interconnects 133, 233, 333 are thus deposited as a dense coating 136 with low oxide content of less than about 0.3 to 0.5%. The coating 136 is a non-porous or low-porous structure having porosity of less than about 0.5% to 2%. Yet, the coating 136 has physical characteristics such as strength comparable or surpassing those of some wrought materials. Exemplary adhesive strength of the particles 58 to one another and to the substrate 62 may be about 10 to 60 MPa or more, about 15 to 40 MPa or more, or about 15 to 25 MPa or more.

In one or more embodiments, a method for direct cold spray deposition of electrical interconnects 133, depicted in FIGS. 5C and 5D, is disclosed. The method for producing interconnects 133 includes providing a pouch cell 100 with tabs 116, 120. The tabs 116, 120 are perforated. The method contemplates perforating the tabs 116, 120 by one or more processes described above. The perforated tabs 116, 120 are then aligned with the busbar 130. The alignment results in the surface area of the tabs 116, 120 being in direct contact with the surface area of the busbar 130. Aligning includes fitting one or more raised portions 132 through the respective perforations 126, as was described above. Additionally, the method includes mechanically connecting the raised portions 132 to the material surrounding the perforations, for example by applying physical pressure, crimping, the like, or a combination thereof. Subsequently, the method includes overlaying the raised portions 132 and/or surrounding area with one or more agglomerations 134 of solid metal particles, as was described above.

The solid particles are mechanically intermixed with the substrate, the busbar 130, the tab 116, 120, the raised portions 132, or a combination thereof. The agglomerations 134 are free of voids and/or oxide inclusions. The agglomerations 134 may form one or more layers of varying dimensions, shapes, locations, configurations, or a combination thereof. To prevent deposition of the agglomerations 134 elsewhere, a shield or a mask may be applied over the cell 100, the tab 116, the busbar 130, or a combination thereof, the shield or mask preventing deposition of the sprayed material outside of the target areas. The agglomerations 134 forming the interconnects 133 may be cold spray deposited by the method described above.

The dimensions of the deposited material such as height, width, and thickness of the individual interconnects 133 may be varied according to the needs of a particular application. Likewise, at least some of the interconnects 133 may be made from a different material than the remaining interconnects 133. All of the interconnects 133 may be formed at the same time, or a first portion of interconnects 133 may be formed prior to cold spray deposition of a second portion of the interconnects 133. The cold-sprayed interconnects 133 may be planar, compact structures applied as a relatively flat coating and thus may be more space-efficient than the welded or threaded stud interconnects. The amount of agglomerated material 134 should be sufficient to ensure proper joining of the busbar 130 with the tabs 116, preventing detachment, while providing good electrical connection.

In another embodiment, a method for forming interconnects 233, depicted in FIG. 6A, is disclosed. The method includes providing a cell having a busbar 330 and/or tab 116 having a shape different than a rectangle. For example, the depicted non-limiting example shows an L-shaped tab 216. The remaining steps are similar to the steps described above with respect to producing the interconnects 133. The method includes aligning, mechanical connection, and providing an overlayer of agglomeration.

A method of forming interconnects 333, depicted in FIG. 7, is further described herein. The method includes providing a plurality of cells 300 having tabs 308, which are characterized above. The method may include aligning the cells 300 and/or tabs 308 such that the raised portions of the tabs 308a, 308b, and 308c align in the perforations 326 of the cell tab 308c and in the perforations 326 of the busbar 330. The raised portions 332 are then mechanically connected to the surface of the busbar 330. Subsequently, one or more agglomerations are applied over the raised portions 332, the perforations 326, the area surrounding the raised portions and/or perforations, or a combination thereof.

The methods named above may include joining the same or different number of cells to each side of a busbar. More than one method described above may be used to form interconnects of a single battery pack.

While the interconnects of the battery packs may be formed by any type of cold spray deposition technique, a kinetic metallization process may provide a number of advantages. For example, the kinetic metallization process operates at sonic speeds and pressures of about 50 to 130 psig, which is lower than some other cold spray methods which require up to 700 psig. The lower pressure enables to perform the process while using smaller amount of gas such as up to $\frac{1}{10}$ of the gas needed in other types of cold spray methods.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A battery pack comprising:
   a pouch cell having electrode tabs extending therefrom, at least one of the tabs defining at least one tab perforation and at least one tab raised portion;
   a busbar including at least one busbar raised portion in contact with and protruding through the at least one tab perforation and at least one busbar perforation in contact with and coupled to the at least one tab raised portion; and
   an agglomeration of mechanically bound solid metal particles overlaying the tab and busbar raised portions to mechanically bind and electrically connect the at least one of the tabs to the busbar.

2. The battery pack of claim 1, wherein the at least one tab perforation and the at least one busbar raised portion have a same shape.

3. The battery pack of claim 1, wherein the agglomeration forms a continuous strip.

4. The battery pack of claim 1, wherein the at least one busbar perforation and the at least one tab raised portion have a same shape.

5. The battery pack of claim 1, wherein one of or both the at least one tab or busbar raised portion includes an edge extending beyond a boundary of a corresponding perforation.

6. The battery pack of claim 1, wherein the tab or busbar includes a plurality of raised portions arranged in a regular pattern.

7. The battery pack of claim 1, wherein the agglomeration is free of voids, oxide inclusions, or both.

8. The battery pack of claim 1, wherein the at least one tab is L-shaped.

9. A battery pack comprising:
   a pouch cell having electrode tabs extending therefrom, each of the tabs defining a plurality of tab raised portions and a plurality of tab perforations;
   a busbar including a plurality of busbar perforations in contact with and coupled to the plurality of tab raised portions and a plurality of busbar raised portions in contact with and protruding through the plurality of tab perforations; and
   an agglomeration of mechanically bound solid metal particles overlaying the raised portions to mechanically bind and electrically connect the tabs to the busbar.

10. The battery pack of claim 9, wherein each of the tab raised portions is in contact with one of the busbar perforations.

11. The battery pack of claim 9, wherein the agglomeration forms a continuous strip.

12. The battery pack of claim 9, wherein the tab or busbar perforations and the tab or busbar raised portions have a same shape.

13. The battery pack of claim 9, wherein each of the tab or busbar raised portions includes an edge extending beyond a boundary of a corresponding perforation.

14. The battery pack of claim 9, wherein the plurality of tab and/or busbar raised portions is arranged in a regular pattern.

15. The battery pack of claim 9, wherein the agglomeration is free of voids, oxide inclusions, or both.

16. The battery pack of claim 9, wherein each of the tabs is L-shaped.

17. A battery pack comprising:
    a perforated busbar;
    a pair of pouch cells, each having a tab extending therefrom, arranged adjacent to one another such that the tabs are aligned and interconnect, each of the tabs having raised portions protruding through one or more openings in the busbar and at least one of the tabs having one or more perforations corresponding to and in contact with the raised portions of the adjacent tab; and
    an agglomeration of mechanically bound solid metal particles overlaying the raised portions to mechanically bind and electrically connect the tabs to the busbar.

18. The battery pack of claim 17, wherein the at least one of the tabs includes a plurality of perforations configured to house protrusions of an adjacent tab.

19. The battery pack of claim 17, wherein the agglomeration forms a continuous strip.

20. The battery pack of claim 17, wherein each of the raised portions includes an edge extending beyond a boundary of a corresponding one of the openings.

* * * * *